UNITED STATES PATENT OFFICE.

FRANK J. TONE, OF NIAGARA FALLS, NEW YORK, ASSIGNOR TO THE CARBORUNDUM COMPANY, OF NIAGARA FALLS, NEW YORK, A CORPORATION OF PENNSYLVANIA.

REFRACTORY ARTICLE.

1,296,715.   Specification of Letters Patent.   Patented Mar. 11, 1919.

No Drawing.   Application filed September 27, 1918.  Serial No. 255,978.

*To all whom it may concern:*

Be it known that I, FRANK J. TONE, a resident of Niagara Falls, in the county of Niagara and State of New York, have invented a new and useful Improvement in Refractory Articles, of which the following is a full, clear, and exact description.

This invention has relation to refractory articles, such as bats and saggars, used for the placing in a kiln and the burning of pottery and other ceramic and refractory ware. The invention relates more particularly to a saggar containing crystalline carborundum.

In the saggars and refractory forms heretofore produced containing carborundum, there has been a most serious drawback. They have great durability, strength and resistance to high temperature conditions, but they have a pronounced deleterious influence on the ware which is brought in contact with them. This is often apparent on articles placed at a distance of several inches from the carborundum surface, and may make itself evident by a slight blackening or discoloration of the surface of the ware only, or the action may penetrate the ware, causing a weakening and imperfect vitrification of the structure.

I have discovered that this discoloration and deterioration is largely due to surface decomposition of the carborundum grains, and that the products of such decomposition may either blacken the ware being burned or may have a marked reducing action on certain constituents of the clay or other material composing the ware, to the extent of altering its physical structure. This surface decomposition of the carborundum may be caused by metallic bases in the clay in contact with it, or it may be caused by volatile constituents of the kiln gases. In any case, when white ware or table ware is burned in a carborundum saggar, there is often a discoloration or blackening of the ware to an extent which makes it unmarketable. I have discovered that this reducing action of the carborundum may be largely controlled by a proper selection of grain sizes and a proper proportioning of the carborundum to the binder employed. The deoxidizing effect of carborundum and the rate of reaction is proportional to the surface of grain exposed, and it follows that when using carborundum containing a considerable portion of fines, the surface exposed is very much greater than what it is when using coarse numbers. For example, comparing No. 16 carborundum and No. 160 carborundum, the amount of surface exposed in a given volume of the latter is approximately one hundred times that exposed with the former, the diameter of the No. 16 carborundum being approximately ten times that of No. 160. This is a direct measure of its chemical activity.

Furthermore, I have found that by the use of a sufficient proportion of clay material in the mixture to substantially cover the grains, the chemical action of the carborundum is greatly lessened or largely localized. By reducing the amount of carborundum to less than 60% of the entire mixture, I have found that the carborundum crystals are surrounded by a film or covering of clay, which prevents deleterious action of the carborundum on white pottery ware. The use of this decreased proportion of carborundum lessens the effect of mass action tending to carry the reaction to a further degree. The layer of silica has a melting point of 2000° C. While this film may be fluxed somewhat by alkali, iron oxid or other bases, whereby the melting point is lowered and oxidation continues, I have found that there is a tendency for such oxidation to finally reach a limit and become constant with repeated firings. The thickness of this silica film varies from .0001 to .00001 cm.

The following may be taken as a typical mixture for use in accordance with my invention in the manufacture of saggars for white pottery:

Crystalline carborundum---- 40%
Clay grog------------------ 20%
Plastic clay saggar-------- 40%

The carborundum is preferably a material which has been crushed so that it will pass through a No. 16 mesh, thus containing all numbers 16 and finer, but the aim is to have the major portion of the material coarser than No. 60 mesh, so as to cut down its chemical activity. The carborundum should preferably be free from uncombined carbon. The clay grog is material obtained by the recrushing of old saggars or calcined flint fireclay or equivalent material. The fireclay may be any good grade of saggar clay of which the following is a typical analysis:

| | |
|---|---|
| Ign. | 14.03 |
| $SiO_2$ | 63.40 |
| $Al_2O_3$ | 17.32 |
| $Fe_2O_3$ | 1.84 |
| $TiO_2$ | .94 |
| CaO | .20 |
| MgO | .78 |
| $K_2O$ | .58 |
| $Na_2O$ | .91 |

The saggar clay is first thoroughly weathered and then the materials are mixed thoroughly together in a pug mill with water and brought to the consistency generally used in the manufacture of saggars. Saggars may be made by hand or they may be pressed in dies in a saggar machine. After they are pressed they are placed in a dry room and dried in the usual manner and fired in a kiln at about cone 11, corresponding to a temperature of about 1370° C.

Saggars made in accordance with my invention are greatly superior to clay saggars. The latter after four or five firings, even when made more open or porous by means of the addition of grog, frequently become rotten and weak due to the breaking up of the bonding of the clay and the disintegration of the structure. Carborundum saggars have the great advantage that the thermal conductivity of the body is materially increased so that when subjected to changes of temperature, the temperature is quickly equalized throughout the body, and the latter is not subjected to the strains of expansion and contraction, due to differential heat exposure. I have found that when carborundum is present to the extent of only 20% of the mixture, it adds greatly to the thermal conductivity, and that the durability of the saggar is greatly increased.

Carborundum has the further advantage of having a lower coefficient of expansion, thus permitting a more dense body to be used without sacrificing the ability to withstand sudden changes of temperature. Such a dense body possesses much greater strength and resistance to mechanical strains and abrasions.

I do not limit myself to the particular proportions which I have above given since this may be varied considerably without departing from the spirit and scope of the appended claims.

I claim:

1. A refractory article containing fireclay and crystalline carborundum, the carborundum being of a grit, the major portion of which is substantially coarser than No. 60 and constituting less than 60% of the entire mix.

2. A refractory article containing fireclay, grog and crystalline carborundum, the carborundum being of a grit, the major portion of which is substantially coarser than No. 60 and constituting less than 60% of the entire mix.

3. A refractory article containing fireclay and crystalline carborundum, the carborundum being of a grit, the major portion of which is substantially coarser than No. 60 and being present in a proportion sufficient to increase the thermal conductivity to a point where disintegration of the ceramic body due to differential heat exposure substantially ceases.

4. A refractory article consisting of clay material and carborundum, the carborundum being of a grit, the major portion of which is substantially coarser than No. 60.

5. A refractory article consisting of clay material and carborundum, the carborundum being of grit, the major portion of which is substantially coarser than No. 60, and constituting less than 60% of the entire mix.

In testimony whereof, I have hereunto set my hand.

FRANK J. TONE.